April 30, 1946.   C. LYNN   2,399,366
SYNCHRONOUS-CONVERTER VENTILATION
Filed Dec. 30, 1942
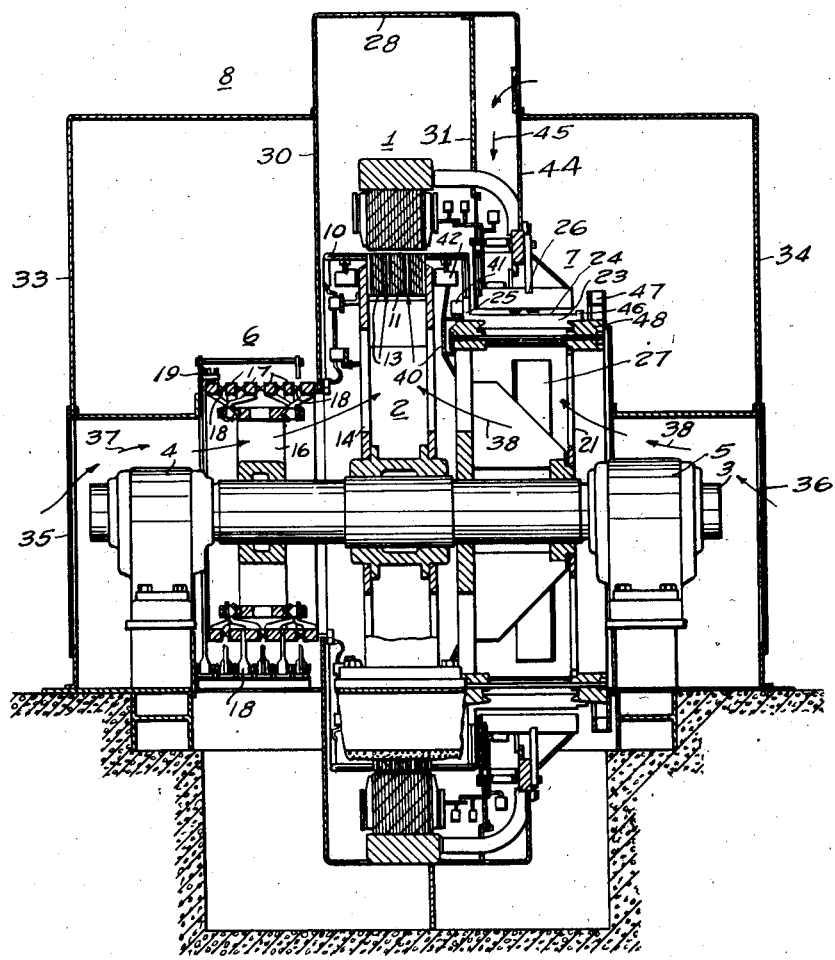
WITNESSES:
INVENTOR
Clarence Lynn.
BY
ATTORNEY Patented Apr. 30, 1946

2,399,366

UNITED STATES PATENT OFFICE 2,399,366

SYNCHRONOUS-CONVERTER VENTILATION

Clarence Lynn, Pittsburgh 21, Pa., assignor to Westinghouse Electric Corporation, East Pittsburgh, Pa., a corporation of Pennsylvania Application December 30, 1942, Serial No. 470,561

14 Claims. (Cl. 171—123)

My invention relates primarily to improvements in the ventilation of synchronous converters, although some of the novel features are also applicable to other kinds of electrical machines.

Synchronous converters are now assuming a partial recovery of their former commercial position, because of the demand of certain industries for direct-current power for purposes where alternating-current power will not suffice.

A long-standing defect of synchronous converters has been the entrance of either carbon-dust from the direct-current brushes, or copper-dust from the alternating-current brushes, into the machine, eventually lowering the insulation-resistance to ground. A synchronous converter, to be economically justifiable, usually has to be a fairly large machine, which is commonly housed in a special ventilating-housing or enclosure. The ventilation of a synchronous converter is always critical, contributing directly to a reduction of the size, and hence the cost, of a machine of any given rating. One or both of these two causes—the enclosing housing, and need for the maximum possible ventilation—have led to the use of ventilating systems in which the air or other ventilating gas which has come into contact with either the direct-current current-collecting assembly (commutator), or the alternating-current current-collecting assembly (collector-rings), or both, has found its way into the machine, where it eventually causes trouble.

The principal object of my invention is to provide a double-ended ventilating-system for a synchronous converter, whereby air or ventilating-gas is brought in, from both ends of the machine, through both the collector-spider and the commutator-spider, to ventilate the armature and field members, in such manner that contamination is substantially avoided from the current-collecting spaces. More specifically, I provide a three-part housing-means, one part for the converter-proper consisting of the field-member stator and the armature-member rotor, and the other two parts for the two current-collecting assemblies, one at each end of the machine, with means for preventing the discharge gases from either of the two last-mentioned parts from substantial admixture with the ventilating-gas for the converter-proper. In this manner, I provide a synchronous converter which is extremely well ventilated and which can offer some assurance that its insulation-resistance will not suffer from dust-particles from the current-collecting devices.

I have also provided special blower-means in the commutator-spider for bringing the air or gas into the machine from that end, special means for ventilating the commutator-necks which are necessarily baffled off from some of their usual ventilation by my housing-segregating partitions or baffles, special means for ventilating the commutator assembly with one or more radial streams of gas which are brought in radially, against centrifugal force, so as to impinge on the cylindrical commutator-surface and then flow axially over the commutator-surface, and special collector-ring ventilating-means. Some of these features are of general application in dynamo-electric machines other than synchronous converters.

An exemplary embodiment of my invention is shown in the accompanying drawing, the single figure of which is a vertical longitudinal sectional view of my improved synchronous converter.

The synchronous converter comprises a field member or assembly 1, which constitutes the stator of the machine, a rotor or armature-member 2, a shaft 3 for supporting the rotor-member, bearing-members 4 and 5 for rotatably supporting the respective ends of the shaft, an alternating-current current-collecting assembly 6 between the rear-end bearing 4 and the rear-end of the rotor 2, a direct-current current-collecting assembly 7 between the front-end bearing 5 and the front-end of the rotor 2 and a housing-member or assembly 8. The direct-current end of the machine is commonly referred to as the front end.

The armature-assembly 2 comprises an armature-winding 10 which is carried by an armature-core 11 comprising an assembly of magnetizable armature-punchings preferably having one or more radial ventilating-spaces 13 between bunches of punchings. The armature-core 11 is supported on an armature-spider 14 which is carried by the shaft 3.

The alternating-current current-collecting assembly 6 comprises a collector-spider 16, carried by the shaft 3, and six collector-rings 17 carried by the collector-spider in such manner that air or other ventilating-gas may flow radially outwardly between and around said collector-rings. I provide blade-means 18 projecting from the sides of the collector-rings 17 for serving as vanes for forcing the air or gas to flow more strongly past the collector-rings, while at the same time serving as fins for providing additional cooling-surfaces for the collector-rings. Cooperating with the collector-rings 17 is an alternating-current brush-assembly 19.

The direct-current collecting assembly 7 comprises a commutator-spider 21, supported by the shaft 3 at the other end of the rotating armature-assembly 2. The commutator-spider carries a commutator which is composed of a plurality of commutator-segments 23 providing a cylindrical commutator-surface 24, and having a plurality of substantially radially disposed commutator-necks 25 for electrically connecting the commutator-segments to the armature-winding 10. A direct-current brush-assembly 26 cooperates with the cylindrical commutator-surface 24. The commutator-spider 21 has internal blades 27 within it for forcing air or other ventilating-gas axially inwardly toward the rotor 2.

The housing 8 is constructed in three parts. A central part, or converter-housing proper, is shown at 28, surrounding the stator-members 1. It may have various forms, and is illustrated as a volute member. According to my invention, the central housing-part 28 has two end-walls 30 and 31 which extend radially inwardly, one at either end of the stator and rotor members 1 and 2, in spaced relation thereto. The housing-wall 30 extends radially inwardly between the rotor 2 and the collector-rings 17, to serve as a separating partition or baffle between the rotor and the collector-ring assembly, preventing dust-laden air or gas from passing from the space surrounding the collector-rings to the rotor-member 2. The other housing-wall 31 extends radially inwardly from the central housing-part 28 almost into contact with the cylindrical commutator-surface 24, slightly in front of the commutator-necks 25. This second housing-wall 31 thus operates as a partition between the commutator-necks 25 and the cylindrical commutator-surface 24, preventing the axial flow of dust-laden air or gas from the space surrounding the commutator to the rotor-member 2 of the machine.

In addition to the central housing-portion 28, the housing 8 is also provided with end-compartments 33 and 34 for the collector-ring chamber and the commutator chamber, respectively.

Air or other gas for ventilating the machine is brought into the machine-proper from both ends, through gas-inlet means 35 and 36, respectively, which surround the respective bearings 4 and 5, and lead the ventilating-gas in two streams 37 and 38, as shown by the arrows. One gas-stream 37 flows in an axial direction over and around the rear bearing 4, and thence into and through the collector-spider 16, and on to the rotor-spider 14, whence it flows radially outwardly around the armature-punchings 11 and through the radial ventilating-spaces 13 therebetween. The other gas-stream 38 comes in from the other end of the machine, and flows over the commutator-end bearing 5, and through the commutator-spider 21, to the rotor-spider 14, where it joins with the gas-stream 37 and flows radially out of the rotor 2, past the stator 1, and into the main housing chamber 28, from which it is discharged. The commutator-end gas-stream 38 is assisted, in its flow, by the fan or blower blades 27 in the commutator-spider 21.

It will be noted that the commutator-necks 25 are prevented from getting their usual front-end ventilation by the baffle 31, which prevents axial gas-flow between the several necks 25. I have accordingly introduced special neck-ventilating means, illustrated in the form of a baffle 40 carried by the rotor-member 2 for diverting a small portion of the commutator-spider gas-stream 38, and directing it toward the backs of the commutator-necks 25. As a further part of the neck-ventilating means, I also provide fins or blade-means 41, carried by the backs or rotor-sides of the necks 25, for forcibly impelling the diverted neck-cooling stream in a radial direction. I also provide special blade-means or vanes 42, carried by the rotor-member 2, for the same purpose. The neck-fins 41 also serve as additional heat-radiating surfaces for transferring heat away from the necks 25.

It will thus be seen that I have provided an adequate, double-ended gas-flow means for well ventilating the converter proper, with gas flowing in from both ends of the machine, with means for completely segregating this ventilating-gas against any possibility of contamination with dust from either one of the current-collector chambers 33 and 34. It is necessary to provide separate means for ventilating the current-collecting assemblies.

The collector-ring assembly 6 is ventilated by diverting a small portion of the collector-end gas-stream 37 from the inside of the collector-spider 16, causing it to flow radially past the collector-rings 17, under the urging of the fins 18 on the sides of the rings, as previously described. This ring-ventilating gas thus enters the collector-end housing part or chamber 33 from which it escapes through a discharge-opening (not shown), which may be any suitable outlet which does not discharge close to the inlets 35 and 36.

The commutator assembly 7 is ventilated by a special means which I have provided for the purpose. Close to the front-end housing-wall or stationary partition 31, I provide duct-forming means or spaced stationary partition-means 44 for causing a gas-stream or streams 45 to flow radially inwardly along the front or commutator-side of the housing-wall 31, so as to impinge upon the cylindrical commutator-surface 24, after which this commutator-cooling gas flows axially along the cylindrical commutator-surface 24, where it is acted upon by fins 46 on the front ends of the commutator-segments 23, and by a fan 47 which is carried by the front-end V-ring 48 of the commutator. This commutator-cooling gas then passes into the commutator chamber 34, from which it escapes, or is exhausted, through a discharge-duct (not shown), which may be any suitable outlet which does not discharge close to the inlets 35 and 36.

In operation, it will be noted that I have provided a two-end double-ventilation system for a synchronous converter; with separate housing-chambers, and special ventilating-means for the two current-collecting assemblies. It will be noted that the two gas-inlet means 35 and 36 constitute guide-means for conducting the incoming air or gas for the converter-armature 2 through the respective current-collecting chambers 33 and 34, so that there is no admixture of the converter-cooling inlet-gas with the dust-laden gas of the current-collecting chambers. It will further be noted that the outlets (not shown) for carrying the ventilating gas away from the respective current-collecting chambers are so disposed that there is substantially no admixture of said current-collector outlet-gas with the gas which enters the inlet-means 35 and 36 for the converter proper.

I claim as my invention:

1. A synchronous converter comprising a stationary field-assembly, a rotatable armature-assembly, an alternating-current current-collecting assembly at the rear end of the armature-assembly, a direct-current current-collecting assembly at the front end of the armature-assembly, the armature-assembly including an armature-winding and an assembly of magnetizable armature-punchings, the alternating-current current-collecting assembly including a plurality of collector-rings and a collector-spider for supporting said rings, the direct-current current-collecting assembly including a commutator and a commutator-spider for supporting said commutator, brushgear associated with both of said current-collecting assemblies, said commutator comprising a plurality of commutator-segments disposed so as to produce a cylindrical commutator-surface, and a plurality of substantially radially disposed commutator-necks for electrically connecting the commutator-segments to the armature-winding, baffle-means for substantially preventing any axial gas-flow between the commutator-necks, ventilating-gas inlet means for conducting a ventilating gas into both the collector-spider and the commutator-spider without substantial contamination with either the space surrounding the collector-rings or the space surrounding the cylindrical commutator-surface, neck-ventilating means for causing a stream of ventilating gas to flow between the commutator-necks and the armature-punchings and to play upon the commutator-necks for cooling the same, and commutator-ventilating means for causing one or more radially directed jets of ventilating gas to play upon the cylindrical commutator-surface for cooling the commutator.

2. The invention as defined in claim 1, characterized by said neck-ventilating means comprising blade-means projecting from the back sides of the commutator-necks for creating a gas-flow and providing an additional heat-transfer surface, in combination with baffle-means disposed between the commutator-necks and the armature assembly for confining and directing the gas-flow thus produced, into intimate engagement with the commutator-necks.

3. The invention as defined in claim 1, characterized by said commutator-ventilating means comprising means for causing the commutator-ventilating gas, after impinging radially upon the cylindrical commutator-surface, to flow axially over the cylindrical commutator-surface.

4. A synchronous converter comprising a stationary field-assembly, a rotatable armature-assembly, an alternating-current current-collecting assembly at the rear end of the armature-assembly, a direct-current current-collecting assembly at the front end of the armature-assembly, the armature-assembly including an armature-winding and an assembly of magnetizable armature-punchings, the alternating-current current-collecting assembly including a plurality of collector-rings and a collector-spider for supporting said rings, the direct-current current-collecting assembly including a commutator and a commutator-spider for supporting said commutator, brushgear associated with both of said current-collecting assemblies, said commutator comprising a plurality of commutator-segments disposed so as to produce a cylindrical commutator-surface, and a plurality of substantially radially disposed commutator-necks for electrically connecting the commutator-segments to the armature-winding, stationary baffle-means disposed close to the front faces of the commutator-necks, and extending radially inwardly into close relation to the cylindrical commutator surface, for segregating the space surrounding the commutator from the armature assembly, ventilating-gas inlet-means for conducting a ventilating gas into both the collector-spider and the commutator-spider without substantial contamination with either the space surrounding the collector-rings or the space surrounding the cylindrical commutator-surface, neck-ventilating means for causing a stream of ventilating gas to flow between the commutator-necks and the armature-punchings and to play upon the commutator-necks for cooling the same, and commutator-ventilating means for causing one or more radially directed jets of ventilating gas to play upon the cylindrical commutator-surface for cooling the commutator.

5. A synchronous converter comprising a stationary field-assembly, a rotatable armature-assembly, an alternating-current current-collecting assembly at the rear end of the armature-assembly, a direct-current current-collector assembly at the front end of the armature-assembly, the armature-assembly including an armature-winding and an assembly of magnetizable armature-punchings, the alternating-current current-collecting assembly including a plurality of collector-rings and a collector-spider for supporting said rings, the direct-current current-collecting assembly including a commutator and a commutator-spider for supporting said commutator, brushgear associated with both of said current-collecting assemblies, said commutator comprising a plurality of commutator-segments disposed so as to produce a cylindrical commutator-surface, and a plurality of substantially radially disposed commutator-necks for electrically connecting the commutator-segments to the armature-winding, stationary baffle-means disposed close to the front faces of the commutator-necks, and extending radially inwardly into close relation to the cylindrical commutator surface, for segregating the space surrounding the commutator from the armature assembly, ventilating-gas inlet-means for conducting a ventilating gas into both the collector-spider and the commutator-spider without substantial contamination with either the space surrounding the collector-rings or the space surrounding the cylindrical commutator-surface, neck-ventilating means for causing a stream of ventilating gas to flow between the commutator-necks and the armature-punchings and to play upon the commutator-necks for cooling the same, means for causing commutator-ventilating gas to flow radially inwardly to the cylindrical commutator-surface in a stream or streams flowing close to the front face of said stationary baffle-means in front of the commutator-necks, and means for causing the commutator-ventilating gas, after impinging radially upon the cylindrical commutator-surface, to flow axially over the cylindrical commutator-surface.

6. A dynamo-electric machine comprising a stator, a rotor, a shaft for supporting the rotor, said shaft having a shaft-portion at each end of the rotor, a bearing for each of said shaft-portions, a commutator-spider carried by one of said shaft-portions between its bearing and the rotor, a plurality of commutator-segments supported by said commutator-spider in such manner as to provide a cylindrical commutator-surface, a plurality of substantially radially disposed commutator-necks for electrically connecting the commutator-segments to the rotor, a ventilating-housing surrounding said stator, an end-wall of said ventilating-housing being disposed in baffle-relation between the commutator-necks and the cylindrical commutator-surface, gas-inlet means for leading a ventilating gas over the bearing adjacent to said commutator-spider, and thence axially through said commutator-spider and into ventilating relation with said rotor, in such manner that the gas entering said gas-inlet means has not been substantially contaminated by the space surrounding said cylindrical commutator-surface, and means for separately ventilating the cylindrical commutator-surface, in combination with baffle-means carried by said rotor and blade-means carried by the rotor-side of said commutator-necks for jointly directing a special stream of ventilating-gas radially along the commutator-necks.

7. A dynamo-electric machine comprising a stator, a rotor, a shaft for supporting the rotor, said shaft having a shaft-portion at each end of the rotor, a bearing for each of said shaft-portions, a commutator-spider carried by one of said shaft-portions between its bearing and the rotor, a plurality of commutator-segments supported by said commutator-spider in such manner as to provide a cylindrical commutator-surface, a plurality of substantially radially disposed commutator-necks for electrically connecting the commutator-segments to the rotor, a ventilating-housing surrounding said stator, an end-wall of said ventilating-housing being disposed in baffle-relation between the commutator-necks and the cylindrical commutator-surface, gas-inlet means for leading a ventilating gas over the bearing adjacent to said commutator-spider, and thence axially through said commutator-spider and into ventilating relation with said rotor, in such manner that the gas entering said gas-inlet means has not been substantially contaminated by the space surrounding said cylindrical commutator-surface, and means for separately ventilating the cylindrical commutator-surface, characterized by the means for separately ventilating the cylindrical ventilating-surface comprising means for causing a gas-stream or streams to flow radially inwardly along the commutator side of said end-wall of the housing so as to impinge upon said cylindrical commutator-surface, and means for causing said gas to then flow axially along said cylindrical commutator-surface.

8. A dynamo-electric machine comprising a stationary field-assembly, a rotatable armature-assembly, a direct-current current-collecting assembly at the front end of the armature-assembly, the armature-assembly including an armature-winding and an assembly of magnetizable armature-punchings, the direct-current current-collecting assembly including a commutator and a commutator-spider for supporting said commutator, brushgear associated with said current-collecting assembly, said commutator comprising a plurality of commutator-segments disposed so as to produce a cylindrical commutator-surface, and a plurality of substantially radially disposed commutator-necks for electrically connecting the commutator-segments to the armature-winding, baffle-means for substantially preventing any axial gas-flow between the commutator-necks, ventilating-gas inlet means for conducting a ventilating gas into the commutator-spider without substantial contamination with the space surrounding the cylindrical commutator-surface, neck-ventilating means for causing a stream of ventilating gas to flow between the commutator-necks and the armature-punchings and to play upon the commutator-necks for cooling the same, and commutator-ventilating means for causing one or more radially directed jets of ventilating gas to play upon the cylindrical commutator-surface for cooling the commutator.

9. The invention as defined in claim 8, characterized by said neck-ventilating means comprising blade-means projecting from the back sides of the commutator-necks for creating a gas-flow and providing an additional heat-transfer surface, in combination with baffle-means disposed between the commutator-necks and the armature assembly for confining and directing the gas-flow thus produced, into intimate engagement with the commutator-necks.

10. The invention as defined in claim 8, characterized by said commutator-ventilating means comprising means for causing the commutator-ventilating gas, after impinging radially upon the cylindrical commutator-surface, to flow axially over the cylindrical commutator-surface.

11. A dynamo-electric machine comprising a stationary field-assembly, a rotatable armature-assembly, a direct-current current-collecting assembly at the front end of the armature-assembly, the armature-assembly including an armature-winding and an assembly of magnetizable armature-punchings, the direct-current current-collecting assembly including a commutator and a commutator-spider for supporting said commutator, brushgear associated with said current-collecting assembly, said commutator comprising a plurality of commutator-segments disposed so as to produce a cylindrical commutator-surface, and a plurality of substantially radially disposed commutator-necks for electrically connecting the commutator-segments to the armature-winding, stationary baffle-means disposed close to the front faces of the commutator-necks, and extending radially inwardly into close relation to the cylindrical commutator surface, for segregating the space surrounding the commutator from the armature assembly, ventilating-gas inlet-means for conducting a ventilating gas into the commutator-spider without substantial contamination with the space surrounding the cylindrical commutator-surface, neck-ventilating means for causing a stream of ventilating gas to flow between the commutator-necks and the armature-punchings and to play upon the commutator-necks for cooling the same, and commutator-ventilating means for causing one or more radially directed jets of ventilating gas to play upon the cylindrical commutator-surface for cooling the commutator.

12. The invention as defined in claim 11, characterized by said neck-ventilating means comprising blade-means projecting from the back sides of the commutator-necks for creating a gas-flow and providing an additional heat-transfer surface, in combination with baffle-means disposed between the commutator-necks and the armature assembly for confining and directing the gas flow thus produced, into intimate engagement with the commutator-necks.

13. The invention as defined in claim 11, characterized by said commutator-ventilating means comprising means for causing the commutator-ventilating gas, after impinging radially upon the cylindrical commutator-surface, to flow axially over the cylindrical commutator-surface.

14. A dynamo-electric machine comprising a stationary field-assembly, a rotatable armature-assembly, a direct-current current-collecting assembly at the front end of the armature-assembly, the armature-assembly including an armature-winding and an assembly of magnetizable armature-punchings, the direct-current current-collecting assembly including a commutator and a commutator-spider for supporting said commutator, brushgear associated with said current-collecting assembly, said commutator comprising a plurality of commutator-segments disposed so as to produce a cylindrical commutator-surface, and a plurality of substantially radially disposed commutator-necks for electrically connecting the commutator-segments to the armature-winding, stationary baffle-means disposed close to the front faces of the commutator-necks, and extending radially inwardly into close relation to the cylindrical commutator surface, for segregating the space surrounding the commutator from the armature assembly, ventilating-gas inlet-means for conducting a ventilating gas into the commutator-spider without substantial contamination with the space surrounding the collector-rings or the space surrounding the cylindrical commutator-surface, neck-ventilating means for causing a stream of ventilating gas to flow between the commutator-necks and the armature-punchings and to play upon the commutator-necks for cooling the same, means for causing commutator-ventilating gas to flow radially inwardly to the cylindrical commutator-surface in a stream or streams flowing close to the front face of said stationary baffle-means in front of the commutator-necks, and means for causing the commutator-ventilating gas, after impinging radially upon the cylindrical commutator-surface, to flow axially over the cylindrical commutator-surface.

CLARENCE LYNN.